(12) United States Patent
Yang et al.

(10) Patent No.: US 10,955,255 B2
(45) Date of Patent: Mar. 23, 2021

(54) NAVIGATION SYSTEM WITH LOCATION BASED PARSER MECHANISM AND METHOD OF OPERATION THEREOF

(71) Applicant: Telenav, Inc., Santa Clara, CA (US)

(72) Inventors: JianYi Yang, San Jose, CA (US); Kumar Maddali, San Ramon, CA (US); JuQiang Zhang, Shanghai (CN)

(73) Assignee: Telenav, Inc., Santa Clara, CA (US)

( * ) Notice: Subject to any disclaimer, the term of this patent is extended or adjusted under 35 U.S.C. 154(b) by 128 days.

(21) Appl. No.: 15/433,651

(22) Filed: Feb. 15, 2017

(65) Prior Publication Data

US 2018/0231391 A1 Aug. 16, 2018

(51) Int. Cl.
| | | |
|---|---|---|
| *G01C 21/36* | (2006.01) | |
| *G06N 5/02* | (2006.01) | |
| *G06N 99/00* | (2019.01) | |
| *G06N 20/00* | (2019.01) | |

(52) U.S. Cl.
CPC .......... *G01C 21/3617* (2013.01); *G06N 5/02* (2013.01); *G06N 20/00* (2019.01)

(58) Field of Classification Search
CPC ..... G01C 21/3617; G06N 99/005; G06N 5/02
See application file for complete search history.

(56) References Cited

U.S. PATENT DOCUMENTS

| | | | |
|---|---|---|---|
| 8,560,561 B2 | 10/2013 | Govani et al. | |
| 8,682,646 B2 | 3/2014 | Li et al. | |
| 9,135,569 B2 | 9/2015 | Narasimha et al. | |
| 9,273,972 B2 | 3/2016 | Narasimha et al. | |
| 2006/0218114 A1 | 9/2006 | Weare et al. | |
| 2010/0036834 A1 | 2/2010 | Bandas | |
| 2012/0317087 A1 | 12/2012 | Lymberopoulos et al. | |
| 2015/0192419 A1* | 7/2015 | Jiang ................. | G01C 21/3682 701/408 |
| 2017/0161301 A1* | 6/2017 | Duschl .................... | G06F 40/12 |
| 2018/0098196 A1* | 4/2018 | Dal Santo ............... | H04L 67/02 |
| 2018/0173999 A1* | 6/2018 | Renard .................. | G06F 17/279 |

\* cited by examiner

*Primary Examiner* — Hunter B Lonsberry
*Assistant Examiner* — Mathew Franklin Gordon
(74) *Attorney, Agent, or Firm* — Perspectives Law Group, Corp.

(57) ABSTRACT

A navigation system comprising of a control circuit configured to: determine a free text query for representing a description of a query target, generate a parsing model based on a recognition pattern within a map, determine a concentric region within the map based on a user location, apply the parsing model based on the concentric region, generate a match based on the parsing model; and a communication circuit, coupled to the control circuit, configured to communicate the match for displaying on a device.

20 Claims, 7 Drawing Sheets

NAVIGATION SYSTEM WITH LOCATION BASED PARSER MECHANISM AND METHOD OF OPERATION THEREOF

TECHNICAL FIELD

An embodiment of the present invention relates generally to a navigation system, and more particularly to a system with a location based parser mechanism.

BACKGROUND ART

Modern consumer and industrial electronics, especially devices such as graphical navigation systems, televisions, projectors, cellular phones, portable digital assistants, and combination devices, are providing increasing levels of functionality to support modern life including location-based information services. Research and development in the existing technologies can take a myriad of different directions.

As users become more empowered with the growth of mobile communication technology, new and old paradigms begin to take advantage of this new space. One such space is regarding the use of location. The possible applications for providing necessary and relevant information to the user based on the location have not yet been fully utilized.

Thus, a need still remains for a navigation system with a location based parser mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a navigation system, comprising: a control circuit configured to: determine a free text query for representing a description of a query target, generate a parsing model based on a recognition pattern within a map, determine a concentric region within the map based on a user location, apply the parsing model based on the concentric region, generate a match based on the parsing model; and a communication circuit, coupled to the control circuit, configured to communicate the match for displaying on a device.

An embodiment of the present invention provides a method of operation of a navigation system comprising: determining, with a control circuit, a free text query for representing a description of a query target; generating a parsing model based on a recognition pattern within a map; determining a concentric region within the map based on a user location; applying the parsing model based on the concentric region; generating a match based on the parsing model; and communicating, with a communication circuit coupled to the control circuit, the match for displaying on a device.

An embodiment of the present invention provides a non-transitory computer readable medium including instructions for a navigation system, comprising: determining a free text query for representing a description of a query target; generating a parsing model based on a recognition pattern within a map; determining a concentric region within the map based on a user location; applying the parsing model based on the concentric region; and generating a match based on the parsing model.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
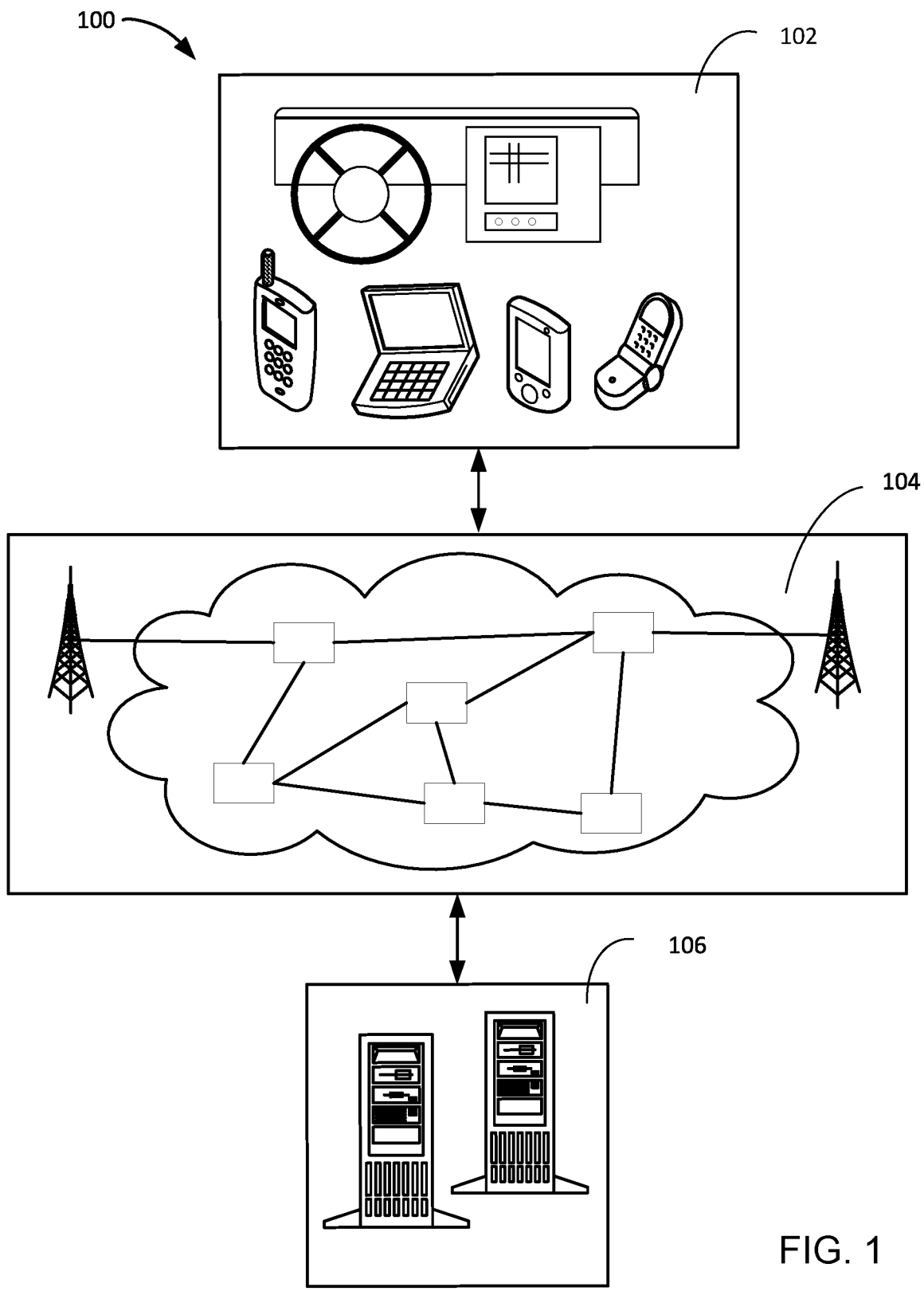
FIG. 1 is a navigation system with a location based parser mechanism in an embodiment of the present invention.

The following embodiments of the present invention provide a set of navigation-related functionalities associated with parsing a free text query. A parsing model can be generated, where the parsing model can be used to parse the free text query from a user located at a user location. The parsing model can leverage regional patterns and dynamically account for user preferences, habits, and previous history in recognizing and further processing the free text query. The parsing model can be used to identify or classify the free text query or portions therein, such as for grouping and recognizing keywords therein. The parsing model can be further utilized to accomplish a goal or a function intended by the free text query, such as for finding targeted information or locating a desired point of interest (POI).

The rules and patterns regarding the parsing model can be generated based on a training data. The training data can be specific to a regional model providing identification of locations based on local terms and relationships. The local terms and relationships may not be easily understood outside of the regional model. The model can be specific to the region, as the user moves outside of the region; a new regional model can be used for the free text parsing.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y); where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein can include the navigation information described as well as information relating to points of interest to the user, such as local business, hours of businesses, types of businesses, advertised specials, traffic information, maps, local events, and location based community or personal information.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a sensor, a microelectromechanical system (MEMS), passive devices, physical non-transitory memory medium having instructions for performing the software function, a portion therein, or a combination thereof.

Referring now to FIG. 1, therein is shown a navigation system 100 with a location based parser mechanism in an embodiment of the present invention. The navigation system 100 includes a first device 102, such as a client or a server, connected to a second device 106, such as a client or server. The first device 102 can communicate with the second device 106 with a network 104, such as a wireless or wired network.

For example, the first device 102 can be of any of a variety of display devices, such as a cellular phone, a personal digital assistant, a notebook computer, an automotive telematics navigation system, a wearable device, a device associated with internet of things (IoT), or other multi-functional mobile communication or entertainment device. The first device 102 can couple, either directly or indirectly, to the network 104 to communicate with the second device 106 or can be a stand-alone device. The first device 102 further can be separate from or incorporated with a vehicle, such as a car, truck, bus, or train.

For illustrative purposes, the navigation system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices, or video transmission devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with the vehicle, such as the car, the truck, the bus, or the train.

Also for illustrative purposes, the navigation system 100 is described with the second device 106 as a computing device, although it is understood that the second device 106 can be different types of devices. Also for illustrative purposes, the navigation system 100 is shown with the second device 106 and the first device 102 as end points of the network 104, although it is understood that the navigation system 100 can have a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or a combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

Figure 2:
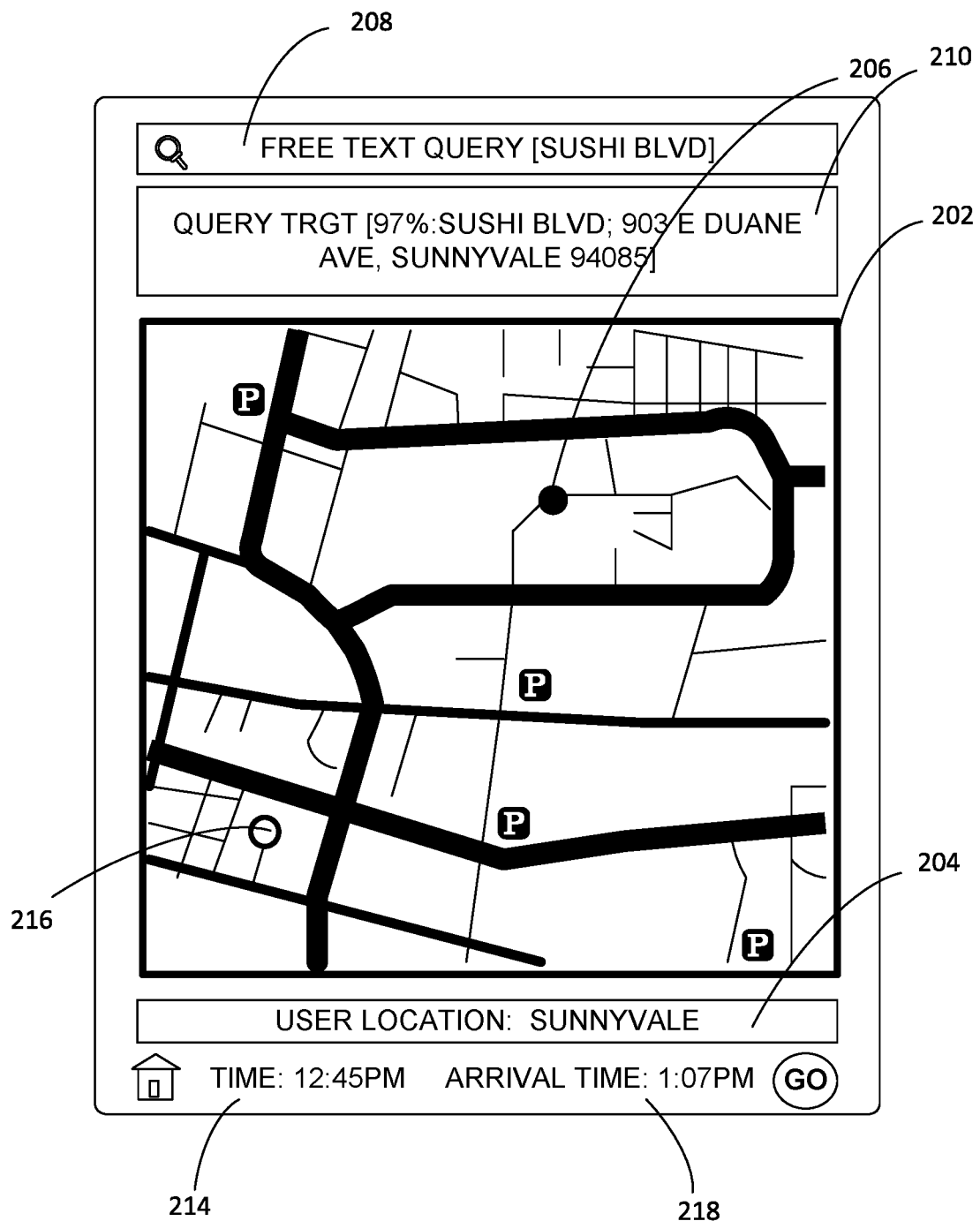
FIG. 2 is an example of a display interface of the navigation system.

Referring now to FIG. 2, therein is shown an example of a display interface for the navigation system 100. The display interface can show a representation of a map 202, a user location 204, a regional model, a free text query 208, a query target 210, or a combination thereof.

The map 202 can represent a geographic area. The map 202 can include an area or a portion of the area based on a country, a region, a continent, a geographical realm, a conceptual realm, or a combination thereof. The map 202 can be displayed on the navigation system 100 with the user location 204.

The map 202 can further represent landmarks, structures, entities, roads or pathways, geographical features, or a combination thereof. For example, the map 202 can correspond to or represent geographical locations of POIs, such as well-known landmarks or businesses, buildings, pedestrian or vehicle paths, mountains or bodies of water, identification information or profile information corresponding thereto, or a combination thereof.

The user location 204 can represent a geographic user location 206 at a current time 214 or an estimate 216 of the geographic user location 206 at a future time 218. The current time 214 can represent an instance in time occurring in the present. For example, the user location 204 can estimate or predict the geographic user location 206 at the future time 218, such as along a navigational route currently traversed by the user or according to a pattern for the user's location.

The user location 204 can include a location or an area corresponding to a user (not shown) of the navigation system 100 or a device associated with the user, such as the first device 102 of FIG. 1 owned by the user or interfacing with the user. The user location 204 can be processed as a target for analysis by the navigation system 100. For example, the user location 204 can be a point on the map 202 for suggesting the regional model.

The geographic user location 206 can be represented as an X, Y coordinate, Z coordinate, longitudinal value, latitudinal value, number block followed by a street name, or a combination thereof. For example, the geographic user location 206 can be a current location of the first device 102 as indicated on the map 202 by an updated indicator.

The estimate 216 can represent an approximation based on received information by the navigation system. The future time 218 can represent an instance in time occurring in the future.

The regional model can represent a database for implementing the embodiments associated with a location. The regional model can represent data corresponding to a subset area or region within the map 202. The regional model can be based on a country, a region, a city, a zip code, a continent, a geographical realm, a conceptual realm, or a combination thereof. For example, the regional model can include the area for Northern California, San Francisco Bay Area, city of Sunnyvale, neighborhood of Lowlanders, or a combination thereof.

The free text query 208 can represent an inquiry or an objective associated with the user. The free text query 208 can include a letter, a number, a symbol, a word, a punctuation mark, spacing, or a combination thereof without a limiting format or sequence. The free text query 208 can include content or keywords arranged in numerous possible unrestricted sequences or formats, such as freely entered or provided by the user.

The free text query 208 can be generated by the first device 102 or the second device 106 to provide the user with information predicted or estimated to be useful to the user, such as based on the user location 204, user's previous history, or a combination thereof. For example, the free text query 208 can also include a suggestion from the first device 102, the second device 106 of FIG. 1, or a combination thereof based on matching keywords in received information, such as a text message or an email.

The free text query 208 can include an input from the user. The free text query 208 can represent a search request from the user for the query target 210. For example, the free text query 208 can be received from the user through the first device 102, the second device 106, or a combination thereof, such as for data corresponding to audio input, visual input, tactile input, device movement input, or a combination thereof from or caused by the user.

The free text query 208 can include or can be translated into text for processing with the navigation system 100. The free text query 208 can include the text intended for seeking, identifying, locating, or a combination thereof for the query target 210.

For example, the free text query 208 can include a name, a category, local information, admin, or a combination thereof for the query target 210. For example, the free text query 208 can include "Subway El Camino" for the free text query 208 targeting a "Subway" restaurant on a street called "El Camino Real". In a further example, the free text query 208 can include the words "Sushi near me" for targeting the nearest sushi restaurant.

The query target 210 can represent a result or a goal intended by the free text query 208. For example, the query target 210 can be the information, location, resource, or a combination thereof accurately predicted or estimated by the navigation system 100 to be helpful or necessary for the user.

Also for example, the query target 210 can represent information desired or sought by the user through the free text query 208. As a more specific example, the query target 210 can be the POI or information associated thereto, a website or a link, an application or a function, a fact or a knowledge, or a combination thereof intended for access by the user through the free text query 208.

The navigation system 100 can utilize the free text query 208 to provide information or resource corresponding to the query target 210. The navigation system 100 can process the free text query 208 to provide a result estimating the query target 210. For example, the navigation system 100 can provide a result or associated features, such as identify a specific POI, provide destination for a navigational route, or a combination thereof.

Figure 3:
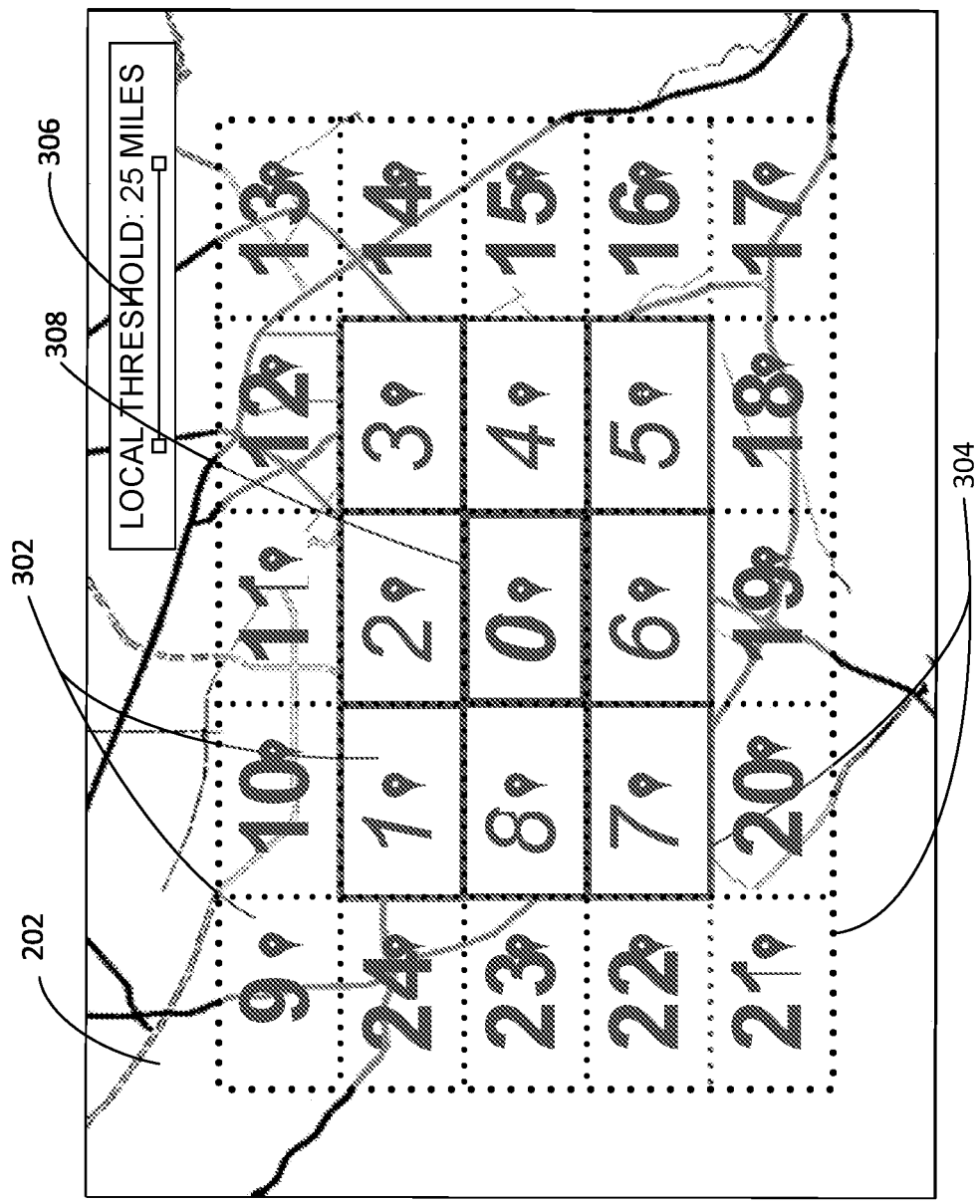
FIG. 3 is an example of the map for the present invention.

Referring now to FIG. 3, therein is shown an example of the map 202 for the present invention. The map 202 can include regions 302, a concentric region 304 on the map 202 with a target region 308, an adjacent region, or a combination thereof. The navigation system 100 of FIG. 1 can process the map 202 based on a local threshold 306.

The regions 302 can be subdivisions, groupings, or sections of areas within the map 202. The navigation system 100 can divide a greater area with the map 202 into regions 302. The regions 302 can be defined by an outline or a set of boundaries. The regions 302 can include non-overlapping areas.

The regions 302 can be subdivisions, groupings, or sections created or generated by the navigation system 100. The regions 302 can be different or separate from municipal boundaries, such as for countries, cities, postal zones, city blocks, neighborhoods, or a combination thereof. The regions can further be different or separate from natural or geological boundaries or divisions, such as waterways, mountain ranges, land shapes, or a combination thereof.

The regions 302 can each have a shape, a size, a dimension, or a combination thereof. All of the regions 302 can have the same or different shape, size, dimension, or a combination thereof. As an illustrative example, the regions 302 have been shown as having identical rectangular boundaries. However, it is understood that the regions 302 can have different shape, size, or dimension for the outline or the boundaries.

For example, the regions 302 can correspond to an outline of a square shape, non-overlapping circular or oval shape, hexagonal shape, or a combination thereof. Also for example, one or more of the regions 302 can have a different or a unique shape, size, dimension, or a combination thereof.

The regions 302 can share the boundaries and be immediately adjacent to each other. One or a set within the regions 302 can be located or arranged relative to another one or set of regions 302. For example, one instance or set of the regions 302 can be concentric or immediately adjacent, such as sharing one or more boundaries, relative to another instance or set of regions 302.

The navigation system 100 can utilize the regions 302 for dividing the map 202 into smaller areas. The navigation system 100 can further utilize the regions 302 such that preference can be given to one or more specific instances of the regions 302 based on proximity to the user location 204 of FIG. 2. In the example shown in FIG. 3, the number, size, and shape of the regions 302 are shown as an example. However, it is understood that the number of the regions 302, the size of the regions 302, and the shape of the regions 302 can be represented by alternate representations, configurations, or a combination thereof as mentioned above.

The concentric region 304 can represent a grouping or a set of the regions 302 arranged in a layered configuration sharing a common reference point or location for aligning and arranging the regions 302. The concentric region 304 can include the regions 302 having the same center, with a set of the regions 302 surrounding and encircling one or more other instances of the regions 302. In the illustrative example, the concentric region 304 can include the region labeled "0" as the center or the common reference point or location, surrounded by other regions labeled "1"-"8".

The concentric region 304 can include the target region 308. The navigation system 100 can utilize or process the target region 308 as the center or the common reference point or location for the concentric region 304. For the illustrative example in FIG. 3, the navigation system 100 can utilize or process the target region 308 as the region labeled as "0".

As illustrated in FIG. 3, the concentric region 304 can include a first concentric set and a second concentric set. The first concentric set can be a grouping or a set of the regions 302 immediately adjacent to the center or the target region 308. The first concentric set can be the inner ring of the regions 302 surrounding or encompassing the center instance of the region. The first concentric set can be the regions 302 specified with labels "1" through "8" as exemplified in FIG. 3.

The second concentric set can be a further grouping or a further set of the regions 302 surrounding or encompassing the first concentric set and the target region 308. The second concentric set can be the regions 302 specified with labels "9" through "24".

Further for the illustrative example in FIG. 3, the navigation system 100 is shown as having 2 concentric regions surrounding region "0". However, it is understood that any number of the concentric region 304 can surround the center or the target region 308, such as for 1 or more concentric sets of regions. For further illustrative purposes, the first concentric set is shown as having 8 total regions and the second concentric set is shown as having 16 regions. However, it is understood that each concentric set can include any number of regions, such as 1 or more.

In the illustrative example in FIG. 3, the regions 302 have been marked and labeled by solid and dotted rectangular lines, numbers, and location markers overlaid on the map 202. It is understood that the lines, the numbers, and the location markers need not be shown on the map 202.

The target region 308 can represent an instance of the regions 302 matching or qualifying a specific processing condition. The target region 308 can correspond to one instance amongst divisions, area or region groupings, sections, or a combination thereof predetermined by the user, the navigation system 100, or a combination thereof. For example, the navigation system 100 can use a predetermined area for the target region 308 based on the regional model, such as a geographic center of a city or the area identified by the user.

The target region 308 can further be determined based on the user location 204 by the navigation system 100 using a size or a dimension, a shape, or a combination thereof for an outline or boundaries of the target region 308. The target region 308 can include the area most frequented by the user, most associated with a context associated with the user or the free text query 208 of FIG. 2, associated with a behavior or history of the user, or a combination thereof.

The target region 308 can also include a dynamic location. For example, the target region 308 can be based on the geographic user location 206 of FIG. 2. The target region 308 can be updated based on the movement of the user within the map 202 or based on changes to the preferences, history, or habits.

The adjacent region can represent the area neighboring, adjacent to, or abutting the target region. The adjacent region can include areas near the target region 308 but without meeting or possessing characteristics, qualities, or traits matching or qualifying the specific processing condition.

The local threshold 306 is a condition or a limitation for defining, identifying, or classifying a portion of the regions 302 with respect to distance and familiarity. The local threshold 306 can include a threshold limit or range for distance in classifying or identifying a set of the regions 302 as being local or specific to an area or location. The local threshold 306 can further include or be based on common or adjacent postal zones, common or adjacent municipal or natural groupings, or a combination thereof.

The local threshold 306 can be used to classify or identify the grouping of the regions 302 relative to the target region 308, the user location 204, or a combination thereof. The local threshold 306 can be used to determine the concentric region 304 or a portion therein. For example, the local threshold 306 can represent a distance or a radius from the center point of the target region 308 or the target region, or from the location of the user for determining a transition between the regions 302.

The local threshold 306 can be fixed or dynamic. For example, the local threshold 306 can be pre-set based a preference by the user or setting of the navigation system 100. In a further example, the local threshold 306 can vary based on driving patterns by the user, context associated with the user or the free text query 208, user settings or preference, user history, or a combination thereof.

Figure 4:
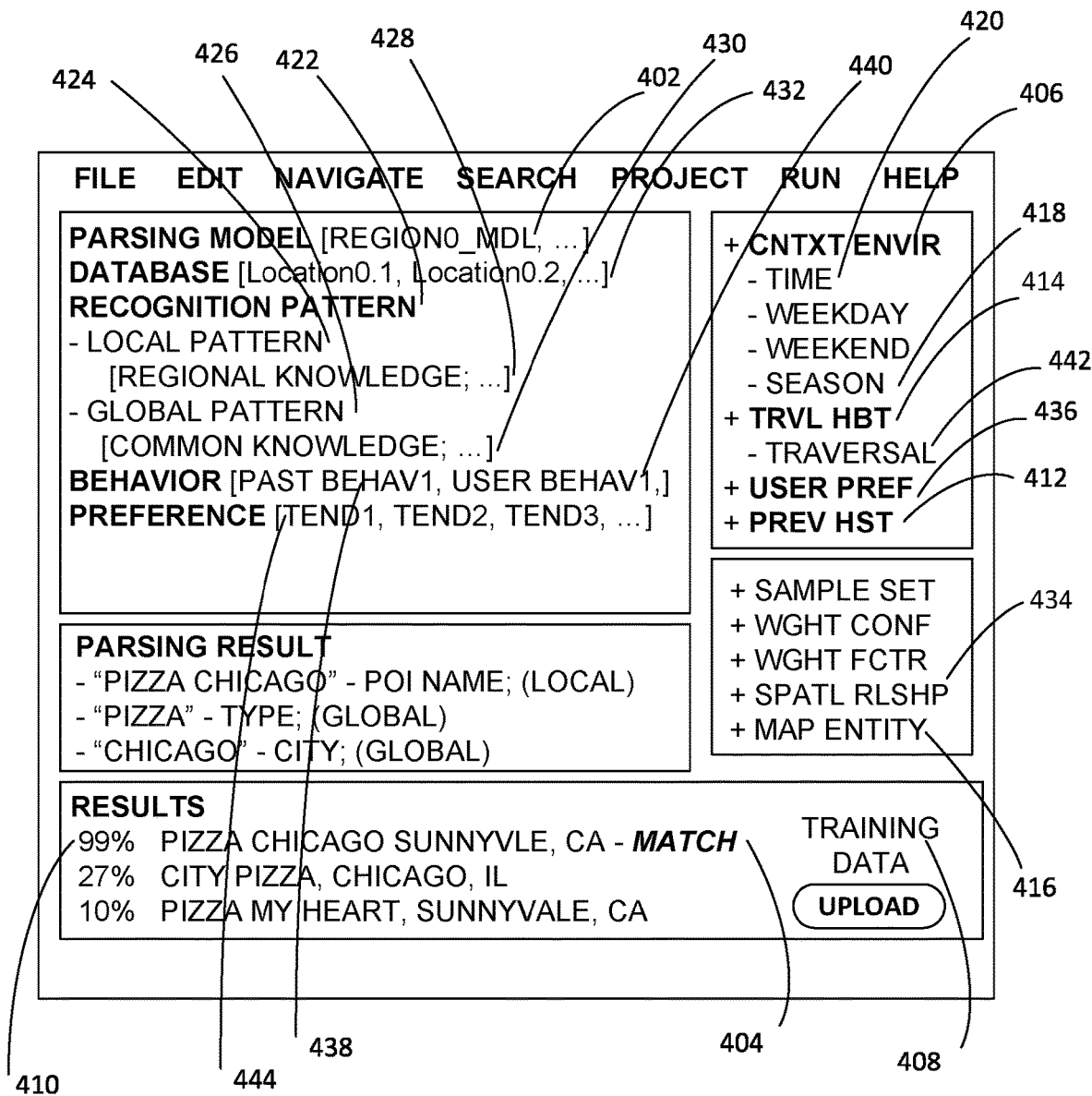
FIG. 4 is an example of a display for an administrative screen for the navigation system.

Referring now to FIG. 4, therein is shown an example of a display for an administrative program for the navigation system 100 of FIG. 1. The display can show parameters for a parsing model 402, a match 404, and a final user selection.

The parsing model 402 is a method, a process, a mechanism, a circuit, a function, a rule, a sequence, an action, or a combination thereof for recognizing a meaning or a significance of an input data for further processing. The parsing model 402 can analyze sets of data or the input to produce a result, such as for recognizing or classifying the free text query 208 of FIG. 2 or a portion therein.

For example, the parsing model 402 can be used to parse the free text query 208. The parsing model 402 can parse the free text query 208 based on the user location 204 of FIG. 2, a contextual environment 406, rules or conditions, or a combination thereof.

The parsing model 402 can be formed, generated, adjusted, or a combination thereof based on a training data 408. The training data 408 is a set of data utilized to form a rule or an action for recognition for the parsing model 402. The training data 408 can include one or more patterns, which can be detected and analyzed to form the rule or the action in recognizing, classifying, or categorizing other subsequent inputs or data. For example, the training data 408 can include terms, phrases, complete addresses, partial addresses, entity names, or a combination thereof.

The training data 408 can be predetermined or designated by the navigation system 100, an administrator or a developer, an external service, or a combination thereof. The training data 408 can further be an initial set or group of data accessed or received by the navigation system 100. The training data 408 can further include data, words, categories, associations thereof, or a combination associated with returned results verified, accepted, utilized or accessed, or a combination thereof by the user. The training data 408 can further be generated by the navigation system 100 specific to an area or a region.

The navigation system 100 can generate the parsing model 402, any classifiers or labels thereof, any portions therein, or a combination thereof based on or according to a variety of mechanisms or processes, such as supervised or unsupervised machine-learning, pattern recognition, deep-learning, or a combination thereof. The navigation system 100 can further utilize the parsing model 402 predetermined by a developer or a service provider.

Parsing the free text query 208 can include analyzing the free text query 208 into components based on search tags. The navigation system 100 can parse based on recognizing or classifying one or more terms or keywords in the free text query 208 corresponding to tags. For example, the parsing model 402 can parse the free text query 208 of "Sushi Blvd" referring to a name or identification tag for the point of interest named "Sushi Blvd" versus the point of interest with the word "Sushi" in the name or identification tag and on a street or an address tag with the word "Blvd".

Also for example, the parsing model 402 can be used to parse or recognize the free text query 208 including "Pizza Chicago". The navigation system 100 can recognize or process the string "Pizza Chicago" as a POI name tag for a POI named "Pizza Chicago", or as two separate words for a category tag or a type tag "Pizza" within a region or location tag of "Chicago". The navigation system 100 can use the parsing model 402 to accurately categorize or recognize one or more terms or words included in the free text query 208.

Also for example, the parsing model 402 can be used to parse or recognize the free text query 208 including "Subway El Camino". The navigation system 100 can potentially recognize "Subway El Camino" as a name for a POI. The navigation system 100 can further potentially recognize "Subway" as a name of an establishment or a categorical description, such as for a transportation means.

The navigation system 100 can separately recognize "El Camino" as a location, a description, a qualification or a condition, or a combination thereof for the preceding term of "Subway". The navigation system 100 can further potentially process different combination of the terms or words. The navigation system 100 can utilize the parsing model 402 to accurately recognize and further process the free text query 208.

The parsing model 402 can be based on a likelihood value 410. The parsing model 402 can be based on distinguishing and utilizing instances of the regions 302 of FIG. 3. For example, the parsing model 402 can be based on categorizing and separating the regions 302 to match known or commonly utilized concept of "local" regions or entities.

As a more specific example, the parsing model 402 can be based on the user location 204, a location associated with user history or profile, a distance from the user location 204 or other significant location to the regions 302 or entities therein, or a combination thereof. Details regarding the utilization and implementation of "local" regions or entities are discussed below.

The parsing model 402 can be based on or include the likelihood value 410. The likelihood value 410 is a probability that a given word or a given set of words mean particular information or knowledge. The likelihood value 410 can be the probability that the given word or the given set of words belong to a specific tag or category. The likelihood value 410 can represent a probability for representing a given word is meant to be tagged to a specific category, given the user location 204.

The likelihood value 410 can further be based on wording, location, distance, a previous history 412, a travel habit 414, a user preference 436, the contextual environment 406, or a combination thereof. The likelihood value 410 can be based on a sequence of terms, a preceding or subsequent term or tag relative to targeted term, a geographic location, a geographic distance or a distance between concepts or clusters, the previous history 412, an importance or popularity of the query target 210 of FIG. 2, or a combination thereof.

For example, the likelihood value 410 can be based on a summation of weights or scores that a potential set of terms for the free text query 208, the location associated with the training data 408, the importance of the query target 210, or a combination thereof. In a further example, the likelihood value 410 can be based on the distance from the user location 204 and a map entity 416. The likelihood value 410 associated with the training data 408 from the target region 308 of FIG. 3 can have a higher weighting value than from the training data 408 in the adjacent region. In a further example, the likelihood value 410 can be based on the final user selection from the previous history 412.

The previous history 412 can represent data associated with a past behavior 438 or device usage of the user. For example, the previous history 412 can include location trace, previously occurring location data, prior searches, prior communications or interactions with other devices, or a combination thereof. The past behavior 438 can represent a previous action or response.

The navigation system 100 can analyze the previous history 412 to determine the travel habit 414. The travel habit 414 can represent a user behavior 440 associated with a traversal 442 within the map 202 of FIG. 2. The user behavior 440 can represent a pattern of actions for the user. The traversal 442 can represent a movement across the map 202.

For example, the travel behavior can represent the pattern of movements for the user. In a further example, the travel habit 414 can represent reoccurring movements, such as regularly occurring daily or weekly commutes, seasonal travels, or a combination thereof.

Also for example, the travel habit 414 can represent regularly occurring positions or locations, such as when the user is at work, school, home, or a combination thereof. Also for example, the travel habit 414 can represent specific roads or segments thereof, types of roads, time periods associated thereto, or a combination thereof preferred or frequently used by the user over other options.

The user preference 436 can represent a tendency 444 of the user behavior 440. For example, the user preference 436 can represent actions made by the user based on particular a preference, a like, a dislike, or a combination thereof for the user. The tendency 444 can represent an expected repetition or occurrence of the user behavior 440.

The user preference 436 can be analyzed and determined by the navigation system 100 from the previous history 412. The user preference 436 can further be specified by the user and received by the navigation system 100.

The contextual environment 406 can represent data associated with a goal, a meaning, a significance, a reason, or a combination thereof surrounding the user, the free text query 208, or a combination thereof. For example, the contextual environment 406 can include a navigation route being utilized by the user, data or resource accessed before the free text query 208, a calendar event preceding or occurring after the free text query 208, a keyword, a season 418, or a time 420 associated thereto, or a combination thereof.

For example, the time 420 can include the current time 214, the time 420 of day, such as morning, afternoon, or evening. In a further example, the contextual environment 406 can include a day of the week such as Monday or portion of the week, such as weekend or weekday. Continuing with the example, the season 418 can include the time of year, such as winter or the time associated with a special occasion, such as Christmas.

The contextual environment 406 can represent current parameters for the navigation system 100. The contextual environment 406 can include elements associated with the time 420, weather, driving conditions, or effort to traverse to a location.

The navigation system 100 can utilize the various factors above to calculate and influence the likelihood value 410. For example, when the user is located in the city of "Sunnyvale", the parsing model 402 can calculate a higher likelihood value for the "Subway" on "El Camino Real" in the city of "Sunnyvale" versus the "Subway" on "El Camino Real" in the city of "Palo Alto".

In a further example, the parsing model 402 can calculate a higher likelihood value for the free text query 208 matching more subsequent wording for an address or the query target 210, such as a full address "1223 Main Street, Anywhere". Continuing with the example, the parsing model 402 can similarly calculate a lower likelihood value for the free text query 208 missing the subsequent wording. For the free text query 208 such as "Sushi Blvd", a search result for the sushi restaurant located on "Sundowner Blvd" can result in a lower likelihood value than the sushi restaurant on "Sushi Blvd" or named "Sushi Blvd".

The parsing model 402 can be based on a recognition pattern 422 within the map 202. The recognition pattern 422 is regularity in processed data. The parsing model 402 can use the recognition pattern 422 to determine or to estimate the appropriate tag for one or more terms within the free text query 208. The recognition pattern 422 can include repetitions in occurrence of data or associations between multiple data within the training data 408.

The recognition pattern 422 can include results from machine learning, deep learning, pattern recognition, or a combination thereof. The recognition pattern 422 can further be included in the training data 408. The recognition pattern 422 can further include rules, guidelines, case statements, or a combination thereof for associating one or more terms to a given tag or category.

For example, the navigation system 100 can determine for the recognition pattern 422 that the term "El Camino" in the free text query 208 can refer to the street named "El Camino Real" when the user location 204 is in the city of "Sunnyvale". In a further example, two capital letters in the free text query 208 can suggest the pattern referring to a state abbreviation.

The recognition pattern 422 can include a local pattern 424, a global pattern 426, or a combination thereof. The local pattern 424 is a configuration or repetition in relationship, association, significance, or a combination thereof specific to or correlating to a specific location or area.

The local pattern 424 can correspond to a regional knowledge 428. The regional knowledge 428 is information known to users familiar with a specific location or area.

For example, the regional knowledge 428 can include or represent the fact that a user in Sunnyvale would likely know "Sushi Blvd" as a name of a restaurant, or that "Sushi Blvd" should be tagged as a restaurant name when searched in Sunnyvale, because a POI with the name "Sushi Blvd" exists in or near Sunnyvale. The local pattern 424 can account for the terms "Sushi Blvd" being tagged as POI name when searched or generated in or near Sunnyvale. If searched or generated outside of or further than a threshold distance from Sunnyvale, the parsing model 402 can avoid applying the local pattern 424 and tag the string differently.

The local pattern 424 can include or be based on a local point of interest, a street name without zip or city, a door number and street without admin, a cross street without admin, a point of interest on a local street, a small city or neighborhood within the local area, a small or private airport or transportation nodes within the local area, or a combination thereof. The navigation system 100 can determine "local" categorization or label for the map entity 416, such as for POIs or other entities represented within the map 202 of FIG. 2, based on distance, the regions 302, the local threshold 306 of FIG. 3, the user location 204, the concentric region 304 of FIG. 3, the target region 308, or a combination thereof.

As a more specific example, the local pattern 424 can include a specification or a categorization for the map entity 416 within the local threshold 306 from the user location 204, within the target region 308 or the concentric region 304 determined according to the local threshold 306, or a combination thereof. The map entity 416 can include a POI, street name, door or address, cross street set, small city or neighborhood, landmark, transportation hub, a name or a description thereof, or a combination thereof.

Based on identification or categorization of "local" for the map entity 416, the navigation system 100 can process and recognize the map entity 416 without other information. For example the navigation system 100 can process and recognize the map entity 416 without postal code, city or state name, admin information, exact address, or a combination thereof.

The global pattern 426 is the configuration or the repetition in relationship, association, significance, or a combination thereof unrelated to a specific location or area, generic and related to a wide area. The global pattern 426 can represent patterns, relationship, or associations based on a common knowledge 430. The common knowledge 430 is information known to a general population or having a non-ambiguous location.

For example, the common knowledge 430 can include or represent the fact that most users in United States, users unrelated to or limited to a specific region, would likely recognize "Chicago Pizza" as a specific type or style of pizza originating in or made famous in the city of Chicago. The global pattern 426 can account for the common knowledge 430 and recognize "Chicago Pizza" as a tag for restaurant or POI category.

The global pattern 426 can include or be based on a full address, a city or the city and state, a point of interest with obvious admin information, a brand without admin, a landmark, a big airport, or a combination thereof. The global pattern 426 can be applied to the regions 302 or areas beyond or outside of the "local area", such as outside or beyond the local threshold 306. The parsing model 402 can apply or implement the local pattern 424 emphasized over the global pattern 426, such as calculating higher instances of the likelihood value 410 for the local pattern 424, processing the local pattern 424 before the global pattern 426, or a combination thereof.

The navigation system 100 can generate a parsed result based on recognizing or tagging the free text query 208. The parsed result is an output from the parsing model 402 based on an input of the free text query 208. The parsed result can include multiple parsed terms based on the recognition pattern 422 analyzed by the parsing model 402. The parsed result can include the free text query 208, one or more portions therein, or a combination thereof tagged according to the recognition pattern 422.

The navigation system 100 can also use the parsing model 402 to determine the category within a database 432 to search with the parsed result. For example, the parsed result of "Sushi Blvd" can be used to search the database 432 using the category for entity names or street names. The database 432 can be a structured set of data for accessing by the first device 102, the network 104, the second device 106, or the combination thereof. The database 432 can include the map 202, the map entity 416, a property or a description thereof or a combination thereof.

The navigation system 100 can generate the search result. The search result can represent the output from searching the database 432 with the parsed result. The search result can include one or more data, resource, address, or a combination thereof matching the free text query 208 according to the parsing or tagging for the parsed result.

The search result can be prioritized based on the likelihood value 410 corresponding to the search result. For example, the search result meeting only a portion of the parsed result can have lower likelihood value. In a further example, the search result located closer to the user location 204 can have the higher likelihood value than the search result farther away from the user location 204.

The navigation system 100 can utilize or leverage a spatial relationship 434 for the parsing model 402. The spatial relationship 434 is a geographic association, arrangement, configuration, spacing or distance, or a combination thereof between locations.

The spatial relationship 434 can describe relative arrangement, configuration, spacing or distance, or a combination thereof between the regions 302, the map entity 416, the user location 204, or a combination thereof. For example, the spatial relationship 434 can describe the geographic arrangement or configuration of the concentric region 304. As a more specific example, the spatial relationship 434 can describe the regions 302 as being adjacent, abutting, surrounding or encompassing, or a combination thereof relative to one instance of the regions 302 or the user location 204.

The navigation system 100 can calculate a matching score for the search result. The matching score can represent a probability or confidence value for that the search result is the output or the outcome sought or desired by the user through the free text query 208. The navigation system 100 can calculate the matching score based on the content or the text of the free text query 208, the parsed result, the search result, the database 432, a connection thereof, or a combination thereof.

One or more instances of the search result corresponding to the matching score with the larger value, above a predetermined threshold, or a combination thereof can be associated as best match for the free text query 208. The navigation system 100 can determine such search result as the match 404 for the free text query 208.

The navigation system 100 can determine the final user selection representing a choice made by the user of the navigation system 100. The final user selection can include the query target 210 chosen by the user from the search result. The final user selection can be utilized to provide information to update the predictive qualities for the parsing model 402.

For example, the free text query 208, the parsed result, the search result, or a combination thereof corresponding to the final user selection can be utilized as the training data 408. Also for example, the likelihood value 410 corresponding to the parsed result, the free text query 208, the search result, or a combination thereof can be adjusted or increased based on the final user selection confirming the parsing process.

Figure 5:
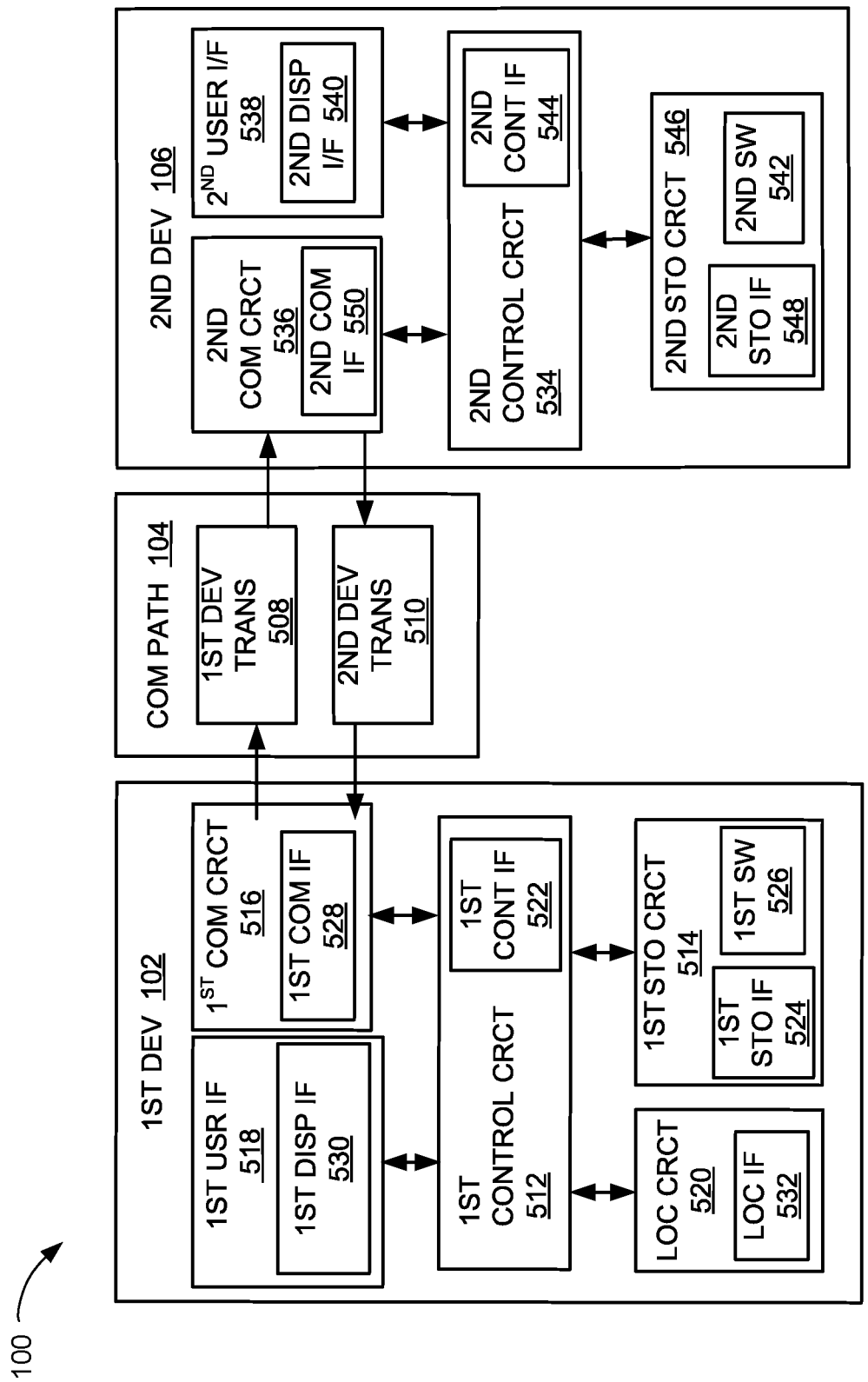
FIG. 5 is an exemplary block diagram of the navigation system.

Referring now to FIG. 5, therein is shown an exemplary block diagram of the navigation system 100. The navigation system 100 can include the first device 102, the network 104, and the second device 106. The first device 102 can send information in a first device transmission 508 over the network 104 to the second device 106. The second device 106 can send information in a second device transmission 510 over the network 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 512, a first storage circuit 514, a first communication circuit 516, and a first user interface 518, and a location circuit 520. The first control circuit 512 can include a first control interface 522. The first control circuit 512 can execute a first software 526 to provide the intelligence of the navigation system 100.

The first control circuit 512 can be implemented in a number of different manners. For example, the first control circuit 512 can be a processor, an application specific integrated circuit (ASIC) an embedded processor, a microprocessor, a hardware control logic, a hardware finite state machine (FSM), a digital signal processor (DSP), or a combination thereof. The first control interface 522 can be used for communication between the first control circuit 512 and other functional circuits in the first device 102. The first control interface 522 can also be used for communication that is external to the first device 102.

The first control interface 522 can receive information from the other functional circuits or from external sources, or can transmit information to the other functional circuits or to external destinations. The external sources and the external destinations refer to sources and destinations external to the first device 102.

The first control interface 522 can be implemented in different ways and can include different implementations depending on which functional circuits or external circuits are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The first storage circuit 514 can store the first software 526. The first storage circuit 514 can also store the relevant information, such as data representing incoming images, data representing previously presented image, sound files, or a combination thereof.

The first storage circuit 514 can be a volatile memory, a nonvolatile memory, an internal memory, an external memory, or a combination thereof. For example, the first storage circuit 514 can be a nonvolatile storage such as non-volatile random access memory (NVRAM), Flash memory, disk storage, or a volatile storage such as static random access memory (SRAM).

The first storage circuit 514 can include a first storage interface 524. The first storage interface 524 can be used for communication between the first storage circuit 514 and other functional circuits in the first device 102. The first storage interface 524 can also be used for communication that is external to the first device 102.

The first storage interface 524 can receive information from the other functional circuits or from external sources, or can transmit information to the other functional circuits or to external destinations. The external sources and the external destinations refer to sources and destinations external to the first device 102.

The first storage interface 524 can include different implementations depending on which functional circuits or external circuits are being interfaced with the first storage circuit 514. The first storage interface 524 can be implemented with technologies and techniques similar to the implementation of the first control interface 522.

The first communication circuit 516 can enable external communication to and from the first device 102. For example, the first communication circuit 516 can permit the first device 102 to communicate with the second device 106, an attachment, such as a peripheral device or a desktop computer, and the network 104.

The first communication circuit 516 can also function as a communication hub allowing the first device 102 to function as part of the network 104 and not limited to be an end point or terminal circuit to the network 104. The first communication circuit 516 can include active and passive components, such as microelectronics or an antenna, for interaction with the network 104.

The first communication circuit 516 can include a first communication interface 528. The first communication interface 528 can be used for communication between the first communication circuit 516 and other functional circuits in the first device 102. The first communication interface 528 can receive information from the other functional circuits or can transmit information to the other functional circuits.

The first communication interface 528 can include different implementations depending on which functional circuits are being interfaced with the first communication circuit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, a camera, an infrared sensor for receiving remote signals, or any combination thereof to provide data and communication inputs.

The first user interface 518 can include a first display interface 530. The first display interface 530 can include an output device. The first display interface 530 can include a display, a projector, a video screen, a speaker, or any combination thereof.

The first control circuit 512 can operate the first user interface 518 to display information generated by the navigation system 100. The first control circuit 512 can also execute the first software 526 for the other functions of the navigation system 100, including receiving location information from the location circuit 520. The first control circuit 512 can further execute the first software 526 for interaction with the network 104 via the first communication circuit 516.

The location circuit 520 can generate location information, current heading, current acceleration, and current speed of the first device 102, as examples. The location circuit 520 can be implemented in many ways. For example, the location circuit 520 can function as at least a part of the global positioning system, an inertial navigation system, a cellular-tower location system, a pressure location system, or any combination thereof. Also, for example, the location circuit 520 can utilize components such as an accelerometer or GPS receiver.

The location circuit 520 can include a location interface 532. The location interface 532 can be used for communication between the location circuit 520 and other functional circuits in the first device 102. The location interface 532 can also be used for communication external to the first device 102.

The location interface 532 can receive information from the other functional circuits or from external sources, or can transmit information to the other functional circuits or to external destinations. The external sources and the external destinations refer to sources and destinations external to the first device 102.

The location interface 532 can include different implementations depending on which functional circuits or external circuits are being interfaced with the location circuit 520. The location interface 532 can be implemented with technologies and techniques similar to the implementation of the first control circuit 512.

The second device 106 can be optimized for implementing an embodiment of the present invention in a multiple device embodiment with the first device 102. The second device 106 can provide the additional or higher performance processing power compared to the first device 102. The second device 106 can include a second control circuit 534, a second communication circuit 536, a second user interface 538, and a second storage circuit 546.

The second user interface 538 allows a user (not shown) to interface and interact with the second device 106. The second user interface 538 can include an input device and an output device. Examples of the input device of the second user interface 538 can include a keypad, a touchpad, softkeys, a keyboard, a microphone, a camera, or any combination thereof to provide data and communication inputs. Examples of the output device of the second user interface 538 can include a second display interface 540. The second display interface 540 can include a display, a projector, a video screen, a speaker, or any combination thereof.

The second control circuit 534 can execute a second software 542 to provide the intelligence of the second device 106 of the navigation system 100. The second software 542 can operate in conjunction with the first software 526. The second control circuit 534 can provide additional performance compared to the first control circuit 512.

The second control circuit 534 can operate the second user interface 538 to display information. The second control circuit 534 can also execute the second software 542 for the other functions of the navigation system 100, including operating the second communication circuit 536 to communicate with the first device 102 over the network 104.

The second control circuit 534 can be implemented in a number of different manners. For example, the second control circuit 534 can be a processor, an embedded processor, a microprocessor, hardware control logic, a hardware finite state machine (FSM), a digital signal processor (DSP), or a combination thereof.

The second control circuit 534 can include a second control interface 544. The second control interface 544 can be used for communication between the second control circuit 534 and other functional circuits in the second device 106. The second control interface 544 can also be used for communication that is external to the second device 106.

The second control interface 544 can receive information from the other functional circuits or from external sources, or can transmit information to the other functional circuits or to external destinations. The external sources and the external destinations refer to sources and destinations external to the second device 106.

The second control interface 544 can be implemented in different ways and can include different implementations depending on which functional circuits or external circuits are being interfaced with the second control interface 544. For example, the second control interface 544 can be implemented with a pressure sensor, an inertial sensor, a microelectromechanical system (MEMS), optical circuitry, waveguides, wireless circuitry, wireline circuitry, or a combination thereof.

A second storage circuit 546 can store the second software 542. The second storage circuit 546 can also store the information such as data representing incoming images, data representing previously presented image, sound files, or a combination thereof. The second storage circuit 546 can be sized to provide the additional storage capacity to supplement the first storage circuit 514.

For illustrative purposes, the second storage circuit 546 is shown as a single element, although it is understood that the second storage circuit 546 can be a distribution of storage elements. Also for illustrative purposes, the navigation system 100 is shown with the second storage circuit 546 as a single hierarchy storage system, although it is understood that the navigation system 100 can have the second storage circuit 546 in a different configuration. For example, the second storage circuit 546 can be formed with different storage technologies forming a memory hierarchal system including different levels of caching, main memory, rotating media, or off-line storage.

The second storage circuit 546 can be a volatile memory, a nonvolatile memory, an internal memory, an external memory, or a combination thereof. For example, the second storage circuit 546 can be a nonvolatile storage such as non-volatile random access memory (NVRAM), Flash memory, disk storage, or a volatile storage such as static random access memory (SRAM).

The second storage circuit 546 can include a second storage interface 548. The second storage interface 548 can be used for communication between the second storage circuit 546 and other functional circuits in the second device 106. The second storage interface 548 can also be used for communication that is external to the second device 106.

The second storage interface 548 can receive information from the other functional circuits or from external sources, or can transmit information to the other functional circuits or to external destinations. The external sources and the external destinations refer to sources and destinations external to the second device 106.

The second storage interface 548 can include different implementations depending on which functional circuits or external circuits are being interfaced with the second storage circuit 546. The second storage interface 548 can be implemented with technologies and techniques similar to the implementation of the second control interface 544.

The second communication circuit 536 can enable external communication to and from the second device 106. For example, the second communication circuit 536 can permit the second device 106 to communicate with the first device 102 over the network 104.

The second communication circuit 536 can also function as a communication hub allowing the second device 106 to function as part of the network 104 and not limited to be an end point or terminal circuit to the network 104. The second communication circuit 536 can include active and passive components, such as microelectronics or an antenna, for interaction with the network 104.

The second communication circuit 536 can include a second communication interface 550. The second communication interface 550 can be used for communication between the second communication circuit 536 and other functional circuits in the second device 106. The second communication interface 550 can receive information from the other functional circuits or can transmit information to the other functional circuits.

The second communication interface 550 can include different implementations depending on which functional circuits are being interfaced with the second communication circuit 536. The second communication interface 550 can be implemented with technologies and techniques similar to the implementation of the second control interface 544.

The first communication circuit 516 can couple with the network 104 to send information to the second device 106 in the first device transmission 508. The second device 106 can receive information in the second communication circuit 536 from the first device transmission 508 of the network 104.

The second communication circuit 536 can couple with the network 104 to send information to the first device 102 in the second device transmission 510 The first device 102 can receive information in the first communication circuit 516 from the second device transmission 510 of the network 104. The navigation system 100 can be executed by the first control circuit 512 the second control circuit 534, or a combination thereof. For illustrative purposes, the second device 106 is shown with the partition having the second user interface 538, the second storage circuit 546, the second control circuit 534, and the second communication circuit 536, although it is understood that the second device 106 can have a different partition. For example, the second software 542 can be partitioned differently such that some or all of its function can be in the second control circuit 534 and the second communication circuit 536. Also, the second device 106 can include other functional circuits not shown in FIG. 4 for clarity.

The functional circuits in the first device 102 can work individually and independently of the other functional circuits. The first device 102 can work individually and independently from the second device 106 and the network 104.

The functional circuits in the second device 106 can work individually and independently of the other functional circuits. The second device 106 can work individually and independently from the first device 102 and the network 104.

The functional circuits described above can be implemented in hardware. For example, one or more of the functional circuits can be implemented using a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the navigation system 100 is described by operation of the first device 102 and the second device 106. It is understood that the first device 102 and the second device 106 can operate any of the modules and functions of the navigation system 100.

Figure 6:
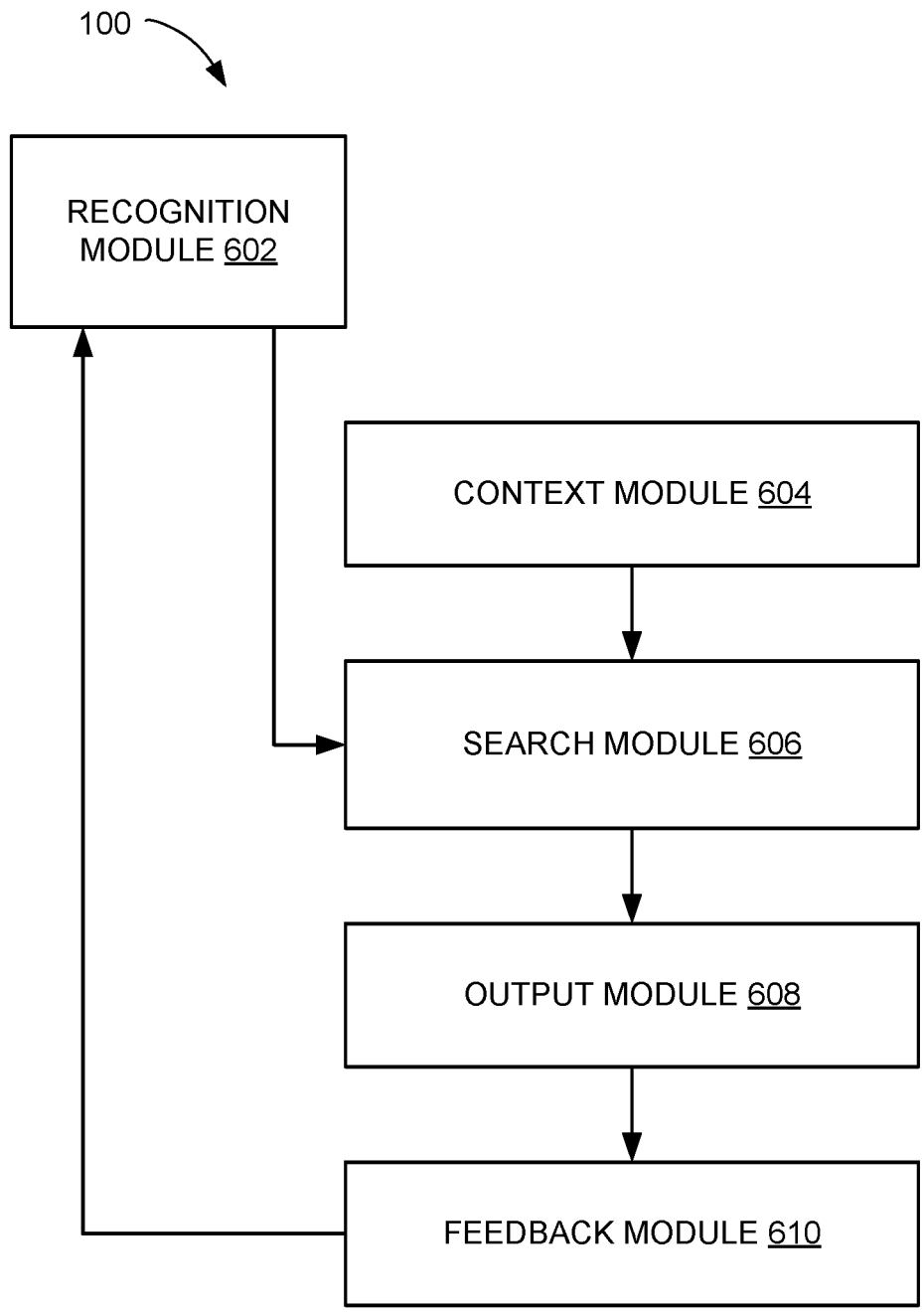
FIG. 6 is a control flow of the navigation system.

Referring now to FIG. 6 therein is shown a control flow of the navigation system 100. The navigation system 100 can include a recognition module 602, a context module 604, a search module 606, an output module 608, a feedback module 610, or a combination thereof.

The recognition module 602 can be coupled to the search module 606 and the feedback module 610 using wired or wireless connections, by having an output of one module as an input of the other module, by having operations of one module influence operations of the other module, or a combination thereof. Similarly, the context module 604 can be coupled to the search module 606, the search module 606 can be coupled to the output module 608, and the output module 608 can be coupled to the feedback module 610.

The recognition module 602 is configured to analyze the recognition pattern 422 of FIG. 4 for the parsing model 402 of FIG. 4. The recognition module 602 can analyze the recognition pattern 422 in the training data 408 of FIG. 4 to generate the parsing model 402 for parsing the free text query 208 of FIG. 2 to identify the search result.

The recognition module 602 can generate the parsing model 402 dynamically in response to or based on determining the user location 204 of FIG. 2, the free text query 208, or a combination thereof. The recognition module 602 can further generate the parsing model 402 before or independent of determining the user location 204, the free text query 208, or a combination thereof.

The recognition module 602 can determine the user location 204 using the first device 102 of 102 FIG. 1, the second device 106 of FIG. 1, or a combination thereof. For example, the recognition module 602 can determine the user location 204 based on calculating the user location 204 using the location circuit 520 of FIG. 5, sending and receiving the user location 204 between devices using the first communication circuit 516 of FIG. 5 and the second communication circuit 536 of FIG. 5, or a combination thereof. The recognition module 602 can further determine the user location 204 based on storing or accessing the user location 204 using the first storage circuit 514 of FIG. 5, the second storage circuit 546 of FIG. 5, or a combination thereof.

The recognition module 602 can further determine the free text query 208 using the first device 102, the second device 106, or a combination thereof. For example, the recognition module 602 can predict or estimate the free text query 208 using the first control circuit 512 of FIG. 5, the second control circuit 534 of FIG. 5, or a combination thereof. The recognition module 602 can predict or estimate based on accessing the previous history 412 of FIG. 4 stored in the first or second storage circuit, analyzing one or more patterns therein, matching the one or more patterns to current conditions or context, or a combination thereof.

Also for example, the recognition module 602 can further determine the free text query 208 based on interacting with the user and receiving information from the user through the first user interface 518 of FIG. 5, the second user interface 538 of FIG. 5, or a combination thereof. The recognition module 602 can similarly communicate the free text query 208 between devices using the one or more communication circuits as exemplified above.

The recognition module 602 or a submodule therein can generate the parsing model 402 based on determining the training data 408, dividing the map 202 of FIG. 2, analyzing patterns, or a combination thereof. The recognition module 602 can also analyze the recognition pattern 422 for the parsing model 402 based on the training data 408, rules, feedback, or a combination thereof to generate the parsing model 402.

The recognition module 602 can divide the map 202 by determining the regions 302 of FIG. 3 relevant to the user location 204 or the estimate 216 of FIG. 2 of the user location 204. The recognition module 602 can dynamically divide the map 202 into the regions 302 based on or in response to the user location 204. The recognition module 602 can further divide the map 202 and determine the regions 302 before or independent of the actual current instance of the user location 204 based on estimates or hypothetical instances of the user location 204.

The recognition module 602 can determine the regions 302 based on a shape, a distance, a dimension, an equation, a process, or a combination thereof relative to the user location 204 or the hypothetical estimate thereof. The recognition module 602 can determine the regions 302 based on determining the boundaries of the target region 308 of FIG. 3 using the user location 204 or the hypothetical estimate thereof as a starting point. The recognition module 602 can further determine the concentric region 304 of FIG. 3 and boundaries thereof using the target region 308 as a reference or a starting point. The recognition module 602 can determine the concentric region 304 and the target region 308 for representing "local" area relative to the user.

The shape, the distance, the dimension, the equation, the process, or a combination thereof can be predetermined by the navigation system 100. The recognition module 602 can further dynamically adjust the shape, the distance, the dimension, the equation, the process, or a combination thereof based on the user, the previous history 412, the user preference 436 of FIG. 4, the contextual environment 406 of FIG. 4, or a combination thereof. The recognition module 602 can further dynamically adjust or calculate a number or a quantity of the concentric sets for the concentric region 304 using similar parameters as above.

For example, the recognition module 602 can increase the size and shape of the regions 302 or the quantity of the concentric sets, for users fitting a predetermined demographics, such as for specific jobs like traveling salesmen or for specific age range associated with mobility, user that's been living at a particular address for longer than a threshold amount of time, or a combination thereof. Also for example, the size and shape of the regions 302 can be adjusted based on a frequency, a distance, a duration, a pattern, an occurrence or a combination thereof in user's movements according to the previous history 412.

The recognition module 602 can further divide the map 202 or access divisions of the map 202 that are fixed or predetermined by the navigation system 100. The recognition module 602 can divide the map 202 into the regions 302 offline, before or independent of receiving or calculating the user location 204. The recognition module 602 can utilize standard or static size, shape, dimension, or a combination thereof to predetermine the regions 302. The recognition module 602 can further utilize unique or various sizes based on population or a number of the map entities, classification of the area, such as for rural or downtown area, contextual factors, or a combination thereof.

The navigation system 100 can further access the predetermined instances of the regions 302 upon receiving or calculating the user location 204 for the search module 606. For generating the parsing model 402, the recognition module 602 can select, systematically or iteratively, one instance of the regions 302 as the target region 308 for representing the hypothetical estimate of the user being located therein. The recognition module 602 can then determine the concentric region 304 similarly as discussed above.

The recognition module 602 can process the training data 408 based on or according to the concentric region 304, the target region 308, or a combination thereof. The training data 408 can be determined specific for the "local" area as represented by the concentric region 304.

The recognition module 602 can determine the training data 408 specific for the concentric region 304 and the target region 308 based on receiving the training data 408 generated by a service provider, an administrator or a developer, the database 432 of FIG. 4 or an external source, or a combination thereof. The recognition module 602 can further determine the training data 408 as the free text query 208, the parsed result, the search result, or a combination thereof validated by the user through the final user selection.

The recognition module 602 can process or analyze the training data 408 to generate the parsing model 402. The recognition module 602 can process or analyze the training data 408 for the recognition pattern 422, such as for the local pattern 424 of FIG. 4, the global pattern 426 of FIG. 4, or a combination thereof.

For example, the recognition module 602 can determine or identify the recognition pattern 422 existing within the training data 408. Also for example, the recognition module 602 can process the training data 408 according to the rules, guidelines, instructions, or a combination thereof provided through the recognition pattern 422.

As discussed above, the recognition module 602 can utilize various mechanisms to generate the parsing model 402 for the concentric region 304 including the target region 308, such as using machine learning or deep learning, pattern recognition, set rules or instructions, or a combination thereof. As a more specific example, the recognition module 602 can generate the parsing model 402 including labels, clusters, weights or scores, or a combination thereof representing knowledge, such as the regional knowledge 428 of FIG. 4 or the common knowledge 430 of FIG. 4.

Continuing with the specific example, the recognition module 602 can generate the parsing model 402 including or leveraging the local pattern 424, such as using labels, clusters, weights or scores, or a combination thereof, corresponding to terms, phrases, addresses, or a combination thereof without admin information, as recognizable to users familiar with the area. The potential search words without admin information for "local" searches that correspond to tags can include a local point of interest, a street name without zip or city, a door number and street without admin, a cross street without admin, a point of interest on a local street, a small city or neighborhood within the local area, a small or private airport or transportation nodes within the local area, or a combination thereof.

Continuing with the specific example, the recognition module 602 can generate the parsing model 402 including or leveraging the global pattern 426, such as using labels, clusters, weights or scores, or a combination thereof, separate from the local pattern 424. The recognition module 602 can generate the parsing model 402 accounting for the common knowledge 430 for when the user provides enough admin information or when the target is widely known without being limited to a specific geographic area. The global pattern 426 accounting for potential search words with admin information or sufficient exposure that correspond to tags can include a full address, a city or the city and state, a point of interest with obvious admin information, a brand without admin, a landmark, a big airport, or a combination thereof.

The recognition module 602 can further generate the parsing model 402 based on calculating the likelihood value 410 of FIG. 4 that one or more words or a hypothetical estimate of one or more keywords in the free text query 208 should be tagged to a specific category. The parsing model 402 can include the likelihood value 410. The recognition module 602 can calculate the likelihood value 410 based on a given or hypothesized instances of the user location 204. The recognition module 602 can calculate the likelihood value 410 as a confidence in accuracy as to the tagging result.

The recognition module 602 can calculate the likelihood value 410 based on a method, a process, an equation, a circuit, or a combination thereof predetermined by the navigation system 100. The recognition module 602 can calculate the likelihood value 410 using a variety of factors as inputs, such as the user's location, a distance between the user's location and a corresponding map entity associated with the tag, the spatial relationship 434 of FIG. 4 between the region including the corresponding map entity and the target region 308, or a combination thereof.

The recognition module 602 can further generate the parsing model 402 to account for the regional knowledge 428, the common knowledge 430, or a combination thereof according to the user location 204. For example, the recognition module 602 can generate the parsing model 402 accounting for the map entity 416 of FIG. 4 in the concentric region 304 for the local pattern 424 and the global pattern 426. Also for example, the recognition module 602 can generate the parsing model 402 accounting for the map entity 416 outside of the concentric region 304 for the global pattern 426 without the local pattern 424.

The recognition module 602 can further generate the parsing model 402 to emphasize the local pattern 424 over the global pattern 426 or a hierarchy between the models. For example, the recognition module 602 can generate the parsing model 402 weighting or attributing higher likelihood values to the local pattern 424 than the global pattern 426. Also for example, the recognition module 602 can generate the parsing model 402 to consider or apply the local pattern 424 before the global pattern 426.

The recognition module 602 can utilize equations, algorithms, decision trees, text analytics, or a combination thereof for analyzing the recognition pattern 422. For example, the recognition module 602 can utilize algorithms based on supervised learning semi supervised learning, unsupervised learning, reinforcement learning, or a combination thereof.

The recognition module 602 can further determine or receive the free text query 208. The recognition module 602 can determine or receive as discussed above.

The recognition module 602 can generate the parsed result from the free text query 208 for searching the database 432. The recognition module 602 or a submodule therein can generate the parsed result using the parsing model 402. The recognition module 602 can divide the free text query 208 into word strings, objects, methods, attributes, or options according to the parsing model 402 to generate the parsed result for management by the first device 102, the second device 106, or a combination thereof.

The recognition module 602 can identify, group, tag, or a combination thereof for the free text query 208 or one or more portions therein according to the parsing model 402. The search module 606 can further define the search category for searching with the parsed result.

The search module 606 can process the free text query 208 using the parsing model 402 based on matching the free text query 208 or the one or more portions therein to known or previously processed recognition pattern 422 of the parsing model 402. The search module 606 can determine the likelihood value 410 corresponding to the connection between the actual received instance of the free text query 208 and hypothetical instance of the free text query 208 in generating the parsing model 402. The search module 606 can further determine the likelihood value 410 based on a degree of match between the free text query 208 or the portion therein and the local pattern 424, the global pattern 426, or a combination thereof.

The search module 606 can adjust the likelihood value 410 based on the degree of match or similarity between the compared data. The search module 606 can tag the words according to or based on the likelihood value 410.

The recognition module 602 can utilize the first control circuit 512, the second control circuit 534, or a combination thereof for processing the training data 408, generating the parsing model 402, dividing the map 202, or a combination thereof. The recognition module 602 can store the parsing model 402, the various patterns, the training data 408, the free text query 208, the regions 302, the concentric region 304, the target region 308, the user location 204, the parsed result, the likelihood value 410, or a combination thereof in the first storage circuit 514, the second storage circuit 546, or a combination thereof.

After determining the parsing model 402, the control flow can pass from the recognition module 602 to the search module 606 storing the processing result from the recognition module 602 for access by the search module 606. The process of generating the match 404 of FIG. 4 from the free text query 208 is described below.

The context module 604 is configured to analyze relevant information regarding or specific to the user associated with or providing the free text query 208. The context module 604 can analyze the relevant information based on analyzing the previous history 412, the contextual environment 406, the user preference 436, or a combination thereof.

For example, the context module 604 can determine the contextual environment 406 using the first device 102, the second device 106, or a combination thereof. As a more specific example, the context module 604 can determine the contextual environment 406 including the current time 214 of FIG. 2, time of determining the free text query 208, current active navigation route or session, calendar events, communication data, other parties or devices within a threshold distance or having at least a threshold signal strength, locations thereof, a portion or a description thereof, a processing result thereof, or a combination thereof. The context module 604 can determine the contextual environment 406 according to a method, a process, a circuit, an instruction, a sequence thereof, a list thereof, or a combination thereof predetermined by the navigation system 100.

Also for example, the context module 604 can analyze the previous history 412 to determine patterns, preferences, or a combination thereof for the user. As a more specific example, the context module 604 can determine the travel habit 414 of FIG. 4 of the user based on recognizing patterns in location or movement with or without connection to the associated contextual environment 406, times of day or week, the regions 302 or a specific area within the map 202, preceding or following calendar events, other participants, other devices providing a sufficient signal strength or within a sufficient distance according to a predetermined threshold, or a combination thereof.

Also as a more specific example, the context module 604 can reinforce, adjust, generate or a combination thereof for the user preference 436 from analyzing the previous history 412, such as according to analyzed patterns therein. The context module 604 can further access the user preference 436 specified by the user and stored in one or more devices in the navigation system 100. The context module 604 can analyze the previous history 412 based on or according to a method, a process, a circuit, an instruction, a sequence thereof, a list thereof, or a combination thereof predetermined by the navigation system 100.

After analyzing relevant information for the user, the control flow can pass to the search module 606. The control flow can pass in a variety of ways, such as based on calling a function or passing a processing result, based on enabling a circuit, communicating data, or a combination thereof.

The search module 606 is configured to respond to the content of the free text query 208. The search module 606 can respond to the content based processing according to the parsed result. For example, the search module 606 can search the database 432 corresponding to the tag for data matching or associated with the free text query 208 or the portion therein corresponding to the tag according to the parsed result.

Continuing with the above example of the free text query 208 including "Pizza Chicago", the parsing model 402 can account for the local pattern 424 including "Pizza Chicago" as a name of a restaurant located within the "local" area relative to the user location 204, as indicated by the concentric region 304. The parsing model 402 can tag the search string as the POI name and subsequently search the appropriate database to access information regarding the POI with name "Pizza Chicago".

Continuing with the example, the search module 606 can further search "Pizza" according to the tag for a category or type and "Chicago" as the tag for city or location in association with parsed result corresponding to the global pattern 426 for the parsing model 402.

The search module 606 can respond emphasizing the local pattern 424 over the global pattern 426. The parsed result can include either the tags associated with the local pattern 424 or both the tag sets for the local pattern 424 and the global pattern 426 when the POI name is found within the concentric region 304 including the user location 204. The parsed result can include only the tags associated with the global pattern 426 when the local pattern 424 does not result in any match for any tags.

The search module 606 can score or rate the search result corresponding to the tags according to the parsed result. The search module 606 can score or rate based on calculating the matching score for the search result. The search module 606 can calculate the matching score in a variety of ways.

For example, the search module 606 can calculate the matching score based on the degree of match, association, or overlap between the free text query 208 and the search result. Also for example, the search module 606 can calculate or adjust the matching score based on the likelihood value 410 associated with the parsed result utilized to find the search result. Also for example, the search module 606 can calculate or adjust the matching score based on the contextual environment 406 or a pattern associated thereto, a distance between the user location 204 or the free text query 208 or the search result, or a combination thereof.

As a more specific example, the search module 606 can calculate the distance, such as for a geographical distance between locations, concepts, knowledges or categories, clusters or patterns, or a combination thereof. The search module 606 can calculate the distance using a process, a method, a circuit, a function, a mechanism, an equation, or a combination thereof predetermined by the navigation system 100.

For the purposes of discussion, the navigation system 100 has been discussed as adjusting the search scores according to the user. However, it is understood that the recognition module 602 can dynamically adjust the parsing model 402 for a specific user by determining or adjusting the concentric region 304 according to the various of influences or input parameters exemplified above.

The search module 606 can use one or more of the control circuits discussed above to determine the result, calculate the score, or a combination thereof. The search module 606 can further store the result, the score, or a combination thereof in one or more of the storage circuits discussed above.

After respond to the content of the free text query 208, the control flow can pass to the output module 608. The control flow can pass using the processing results, such as the matching result or the matching score, other keys or indicators, or a combination thereof.

The output module 608 is configured to communicate the search result to the user. The output module 608 can consolidated the search result from multiple database searches and order them based on the matching score.

The output module 608 can communicate the search result based on the matching score. The output module 608 can display the search result with the highest matching score as the match 404, in a specific location, arrangement or sequence according to the score, or a combination thereof. The output module 608 can further display only the search result with the matching score exceeding a threshold predetermined by the navigation system 100.

The output module 608 can utilize the first control circuit 512, the second control circuit 534, or a combination thereof for processing and controlling the data for communicating the search result. The output module 608 can communicate the data between devices using one or more communication circuits discussed above. The output module 608 can communicate the data to the user through one or more of the devices using one or more of the user interfaces discussed above.

The output module 608 can further utilize the first display interface 530 of FIG. 5, the second display interface 540 of FIG. 5, or a combination thereof for displaying the match 404 and the matching score. The output module 608 can further store the search result, the corresponding scores, or a combination thereof in one or more of the storage units discussed above.

After processing and communicating the match 404, the control flow can pass from the output module 608 to the feedback module 610 based on storing the processing result from the output module 608 for access by the feedback module 610. The control flow can further pass by notifying the feedback module 610, such as by using a flag, an interrupt, a status signal, or a combination thereof. The control flow can further pass by having the output of the output module 608 as an input to the feedback module 610.

The feedback module 610 is configured to process user's response to the communication of the match 404. The feedback module 610 can determine the final user selection corresponding to the search result, such as accepting or verifying the search result, the parsed result, the parsing model 402, or a combination thereof. The feedback module 610 can store the final user selection, the parsed result, the free text query 208, or a combination thereof. The feedback module 610 can also generate patterns and the training data 408 for the recognition module 602.

For example, the feedback module 610 can collect and store instances of the final user selection and the free text query 208 from multiple users of the navigation system 100 for updating the training data 408 or use as the training data 408. In a further example, the feedback module 610 can store the final user selection and the free text query 208 for updating the matching score based on the previous history 412 for the individual user. Also for example, the feedback module 610 can adjust the likelihood value 410 based on the final user selection confirming the parsed result and the parsing model 402 or based on the final user selection indicating an incorrect response than that desired or intended by the user.

The feedback module 610 can utilize the first storage circuit 514, the second storage circuit 534, or the combination thereof for storing the final user selection. The feedback module 610 can also utilize the first control circuit 512, the second control circuit 534, or a combination thereof for updating the training data 408.

It have been discovered that determining the parsing model 402 based on the target region 308 can minimize computing time and increase the accuracy for the navigation system 100. The parsing model 402 can be determined based on the target region 308 and the concentric region 304 representing "local" area. The navigation system 100 can apply an appropriate instance of the parsing model 402 according to the user's location. The usage of the regional knowledge 428 can improve the accuracy for the parsing process, while the usage of the appropriate model and segmenting the models across "local" and "global" can limit the size of the data that needs to be processed for the parsing process.

It has been discovered that determining the local threshold 306 and the concentric region 304 based on the user preference 436, the contextual environment 406, the travel habit 414, or a combination thereof improves the usability of the navigation system 100. The navigation system 100 can adjust the regions 302 for using the local pattern 424 based on parameters specific to the user. This distinction ensures an increased likelihood that the search result correctly matches the free text query 208 intended by the user based on the location of the search result within the regions 302 the user would be more willing to drive to.

Figure 7:
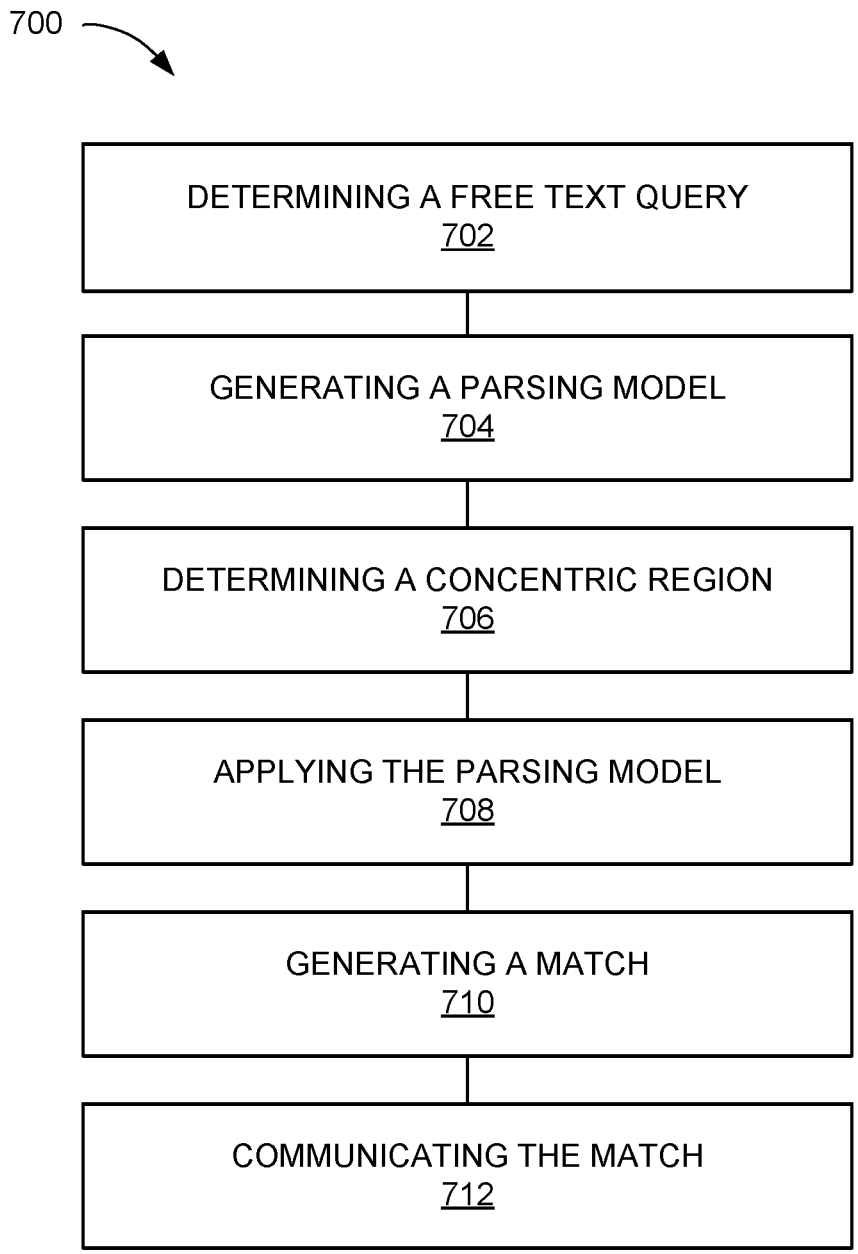
FIG. 7 is a flow chart of a method of operation of the navigation system in an embodiment of the present invention.

Referring now to FIG. 7, therein is shown a flow chart of a method 700 of operation of the navigation system 100 of FIG. 1 in an embodiment of the present invention. The method 700 includes: a determining a free text query for representing a description of a query target box 702; a generating a parsing model based on a recognition pattern within a map box 704; a determining a concentric region based on a user location box 706; an applying the parsing model based on the concentric region box 708; a generating a match based on the parsing model box 710; and a communicating the match for displaying on a device box 712.

The modules described in this application can be hardware implementation or hardware accelerators, including passive circuitry, active circuitry, or both, in the first storage circuit 514 of FIG. 5, the second storage circuit 546 of FIG. 5, the first control circuit 512 of FIG. 5, the second control circuit 534, of FIG. 5, or a combination thereof. The modules can also be hardware implementation or hardware accelerators, including passive circuitry, active circuitry, or both, within the first device 102 of FIG. 1, the second device 106 of FIG. 1, or a combination thereof but outside of the first storage circuit 514, the second storage circuit 546, the first control circuit 512, the second control circuit 534, or a combination thereof.

The navigation system 100 has been described with module functions or order as an example. The navigation system 100 can partition the modules differently or order the modules differently. For example, the navigation system 100 can include one or more separate modules or submodules for dividing the map 202 of FIG. 2, determining the user location 204 of FIG. 2, determining the free text query 208 of FIG. 2, or a combination thereof. Also for example, the recognition module 602 of FIG. 6 can be implemented in series or in parallel with the context module 604 of FIG. 6, the search module 606 of FIG. 6, or a combination thereof. Also for example, the context module 604 can be implemented as a submodule for the search module 606.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware circuit, such as a chip or a processor, or across multiple hardware circuit.

The modules described in this application can be stored in the non-transitory computer readable medium. The first storage circuit 514, the second storage circuit 546, or a combination thereof can represent the non-transitory computer readable medium. The first storage circuit 514, the second storage circuit 546, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The physical transformation of the parsing model 402 of FIG. 4 results in movement in the physical world, such as for the user interacting with one or more of the devices based on display or re-creation of the search result, the match 404 of FIG. 4, the matching score, or a combination thereof. The interaction of the user carrying the first device 102 for initiating the request for the location of the query target 210 of FIG. 2 results in physical displacement of the user.

Movement in the physical world results in updates to the user location 204, the final user selection, the training data 408 of FIG. 4, or a combination thereof which can be fed back into the navigation system 100. The updates can further influence the parsing model 402 for determining the search result based the previous history 412 of FIG. 4.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A navigation system comprising:
a control circuit configured to:
determine a free text query for representing a description of a query target,
generate a parsing model to classify multiple keywords in the free text query based on a name tag, a category tag, a location tag, a type tag, or a combination thereof used to recognize the keywords, and wherein the parsing model is generated based on a recognition pattern within a map and a location from a user history,
determine a concentric region within the map based on a user location,
apply the parsing model based on the concentric region,
generate a match based on the parsing model; and
a communication circuit, coupled to the control circuit, configured to communicate the match for displaying on a device.

2. The system as claimed in claim 1 wherein the control circuit is configured to:
determine a training data based on a global pattern for representing a common knowledge;
determine the training data based on a local pattern for representing a regional knowledge; and
generate the parsing model based on the training data.

3. The system as claimed in claim 1 wherein the control circuit is configured to:
divide the map into regions each including a map entity;

determine a target region for representing an instance of the regions corresponding to the user location; and determine a likelihood value for tagging the free text query or a portion therein in connection with the map entity based on a spatial relationship between the target region and a remaining instance of the regions for parsing the free text query.

4. The system as claimed in claim 1 wherein the control circuit is configured to:

determine a travel habit for representing a user behavior associated with a traversal within the map;

divide the map into regions each including a map entity; and determine a likelihood value for tagging the free text query or a portion therein in connection with the map entity based on analyzing the regions according to the travel habit.

5. The system as claimed in claim 1 wherein the control circuit is configured to:

determine a contextual environment associated with the user location;

divide the map into regions each including a map entity; and determine a likelihood value for tagging the free text query or a portion therein in connection with the map entity based on analyzing the regions according to the contextual environment.

6. The system as claimed in claim 1 wherein the control circuit is configured to generate the parsing model based on emphasizing a local pattern over a global pattern, including the global pattern for representing a common knowledge and the local pattern for representing a regional knowledge.

7. The system as claimed in claim 1 wherein the control circuit is configured to:

determine the user location for representing a geographic user location at a current time, an estimate of the geographic user location at a future time, or a combination thereof;

dynamically divide the map into regions according to the user location and a target region encompassing the user location;

determine a likelihood value for a map entity based on a spatial relationship between the target region and a remaining instance of the regions relative to the target region; and generating the parsing model based on the likelihood value for parsing the free text query.

8. The system as claimed in claim 1 wherein the control circuit is configured to:

divide the map into regions each including a map entity before determining the user location;

determine the user location for representing a geographic user location at a current time or an estimate of the geographic user location at a future time;

determine a target region from the regions encompassing the user location;

determine a likelihood value for the map entity based on a spatial relationship between the target region and a remaining instance of the regions for parsing the free text query; and generate the parsing model based on the likelihood value for parsing the free text query.

9. The system as claimed in claim 1 wherein the control circuit is configured to:

determine a previous history for representing a past behavior;

divide the map into regions each including a map entity; and determine a likelihood value for tagging the free text query or a portion therein in connection with the map entity based on analyzing the regions according to the previous history.

10. The system as claimed in claim 1 wherein the control circuit is configured to:

determine a user preference for representing a tendency of a user behavior;

calculate a local threshold based on the user preference;

determine the concentric region based on the local threshold; and generate the parsing model based on the concentric region corresponding to a local pattern and a global pattern corresponding to one or more portions of the map excluding the concentric region.

11. A method of operation for a navigation system comprising:

determining, with a control circuit, a free text query for representing a description of a query target;

generating a parsing model to classify multiple keywords in the free text query based on a name tag, a category tag, a location tag, a type tag, or a combination thereof used to recognize the keywords, and wherein the parsing model is generated based on a recognition pattern within a map and a location from a user history;

determining a concentric region within the map based on a user location;

applying the parsing model based on the concentric region;

generating a match based on the parsing model; and communicating, with a communication circuit coupled to the control circuit, the match for displaying on a device.

12. The method as claimed in claim 11 wherein generating the parsing model based on the recognition pattern within the map includes:

determining a training data based on a global pattern for representing a common knowledge;

determining the training data based on a local pattern for representing a regional knowledge; and generating the parsing model based on the training data.

13. The method as claimed in claim 11 wherein determining the concentric region within the map based on the user location includes:

dividing the map into regions each including a map entity, determining a target region for representing an instance of the regions corresponding to the user location; and further comprising:

determining a likelihood value for tagging the free text query or a portion therein in connection with the map entity based on a spatial relationship between the target region and a remaining instance of the regions for parsing the free text query.

14. The method as claimed in claim 11 wherein determining the concentric region within the map based on the user location includes:

determining a travel habit for representing a user behavior associated with a traversal within the map, dividing the map into regions each including a map entity; and further comprising:

determining a likelihood value for tagging the free text query or a portion therein in connection with the map entity based on analyzing the regions according to the travel habit.

15. The method as claimed in claim 11 wherein determining the concentric region within the map based on the user location includes:
  determining a contextual environment associated with the user location,
  dividing the map into regions each including a map entity; and
further comprising:
  determining a likelihood value for tagging the free text query or a portion therein in connection with the map entity based on analyzing the regions according to the contextual environment.

16. A non-transitory computer readable medium including instructions for execution by a control circuit, the instructions comprising:
  determining a free text query for representing a description of a query target;
  generating a parsing model to classify multiple keywords in the free text query based on a name tag, a category tag, a location tag, a type tag, or a combination thereof used to recognize the keywords, and wherein the parsing model is generated based on a recognition pattern within a map and a location from a user history;
  determining a concentric region within the map based on a user location;
  applying the parsing model based on the concentric region; and
  generating a match based on the parsing model.

17. The non-transitory computer readable medium with the instructions as claimed in claim 16 wherein generating the parsing model based on the recognition pattern within the map includes:
  determining a training data based on a global pattern for representing a common knowledge;
  determining the training data based on a local pattern for representing a regional knowledge; and
  generating the parsing model based on the training data.

18. The non-transitory computer readable medium with the instructions as claimed in claim 16 wherein determining the concentric region within the map based on the user location includes:
  dividing the map into regions each including a map entity,
  determining a target region for representing an instance of the regions corresponding to the user location; and
further comprising:
  determining a likelihood value for tagging the free text query or a portion therein in connection with the map entity based on a spatial relationship between the target region and a remaining instance of the regions for parsing the free text query.

19. The non-transitory computer readable medium with the instructions as claimed in claim 16 wherein determining the concentric region within the map based on the user location includes:
  determining a travel habit for representing a user behavior associated with a traversal within the map,
  dividing the map into regions each including a map entity; and
further comprising:
  determining a likelihood value for tagging the free text query or a portion therein in connection with the map entity based on analyzing the regions according to the travel habit.

20. The non-transitory computer readable medium with the instructions as claimed in claim 16 wherein determining the concentric region within the map based on the user location includes:
  determining a contextual environment associated with the user location,
  dividing the map into regions each including a map entity; and
further comprising:
  determining a likelihood value for tagging the free text query or a portion therein in connection with the map entity based on analyzing the regions according to the contextual environment.

* * * * *